(12) United States Patent
Skinner (10) Patent No.: US 6,296,262 B1
(45) Date of Patent: Oct. 2, 2001

(54) TABLE CART

(76) Inventor: Maxwell R. Skinner, 5020 Twin Dr., Charlotte, NC (US) 28269

( * ) Notice: Subject to any disclaimer, the term of this patent is extended or adjusted under 35 U.S.C. 154(b) by 0 days.

(21) Appl. No.: 09/526,933

(22) Filed: Mar. 16, 2000

(51) Int. Cl.[7] ................................................. B62B 1/00
(52) U.S. Cl. ..................... 280/79.7; 280/47.34; 280/35
(58) Field of Search ............................... 280/79.7, 79.3, 280/79.11, 35, 638, 47.34, 47.35, 47.41; 248/434, 166

(56) References Cited

U.S. PATENT DOCUMENTS

| | | |
|---|---|---|
| 650,663 | 5/1900 | Whitcher . |
| 1,286,801 | * 12/1918 | Schumacher ........................ 280/79.7 |
| 1,912,864 | * 6/1933 | Stannard ............................ 280/47.34 |
| 2,291,474 | * 7/1942 | Kalmbach .......................... 280/79.7 |
| 2,466,149 | * 4/1949 | Burg ................................... 280/79.3 |
| 2,945,699 | 7/1960 | Berlye . |
| 4,488,733 | * 12/1984 | Hellsten .......................... 280/79.3 X |
| 4,582,204 | * 4/1986 | Wright ............................ 280/79.3 X |
| 4,679,805 | * 7/1987 | Cunningham ................... 280/79.3 X |
| 4,793,624 | * 12/1988 | Mace .............................. 280/47.34 X |
| 5,037,117 | * 8/1991 | Hershberger ....................... 280/79.7 |
| 5,163,695 | 11/1992 | Pakowsky . |
| 5,584,399 | * 12/1996 | King ................................. 280/79.3 X |
| 5,762,348 | * 6/1998 | Echternacht ....................... 280/79.7 |
| 5,820,145 | * 10/1998 | Osowski ............................ 280/79.7 |
| 5,871,219 | 2/1999 | Elliott . |

OTHER PUBLICATIONS

Raymond Products 1998 Catalog No. 981, Minneapolis, Minnesota pp. 1–4, 7 and 8.

* cited by examiner

Primary Examiner—Brian L. Johnson
Assistant Examiner—Bryan Fischmann
(74) Attorney, Agent, or Firm—Christopher C. Dremann

(57) ABSTRACT

A cart for storing and moving a folding table having a generally planar top surface, a plurality of folding legs and a pair of opposed edges includes a horizontal table bed, a vertical table backrest affixed to and extending upwardly from the table bed and at least one latching arm for releasably securing the table on the cart. The table bed includes a pair of horizontal support members longitudinally spaced apart by a longitudinal frame member for receiving and supporting one of the opposed edges of the table. The table bed further includes a pair of legs affixed at one end to and extending downwardly from each of the horizontal support members. The table bed further includes a pair of wheels rotatably attached to the opposite ends of the pair of legs. The height of the horizontal support members is sufficient to receive and support the opposed edge of the table when the table is tipped at an angle of at least about forty-five degrees relative to horizontal. The table backrest includes a pair of vertical support members longitudinally spaced apart by a longitudinal frame member for receiving and supporting the top surface of the table. In a preferred embodiment, the cart stores and moves up to four folding tables. In another preferred embodiment, the cart stores and moves a folding table and up to eight folding chairs.

18 Claims, 5 Drawing Sheets

TABLE CART

CROSS REFERENCE TO RELATED APPLICATION (none)

FIELD OF THE INVENTION

The invention relates generally to a cart for storing and moving a folding table. More particularly, the invention is a cart for storing and moving a folding table that requires only one person to position the table on the cart and that includes means for releasably securing the table on the cart.

BACKGROUND OF THE INVENTION

Group meeting facilities, such as hotels, banquet halls, schools and churches, often utilize folding tables to provide horizontal surfaces for working and eating. In many instances, the folding tables are used only temporarily and it is desirable to store the tables when they are not in use. In other instances, it is desirable to move the folding tables from one location to another location within the facility. The folding tables are typically between about two feet and about three feet in width and between about six feet and about ten feet in length. Thus, two or more persons are needed to lay the folding table on its side so that one person can steady the table while the other person folds the legs inwardly to the fully closed position. Similarly, two or more persons are needed to then lift and carry the folding table to the storage area or to the new location, or to lift the table onto a movable cart. Furthermore, once the folding table is lifted and positioned on the cart, one person is needed to steady the table on the cart while the other person pushes or pulls the cart to the storage area or to the new location. Even with the folding table steadied by one person, existing table carts are cumbersome to maneuver because the center of gravity of the cart is near the floor while the center of gravity of the table is substantially higher. Thus, the center of gravity of the folding table produces a significant moment arm about the center of gravity of the cart. As a result, the folding table can easily fall off the cart if the table it is not secured to the cart, or can even tip the cart over if the table is not properly steadied on the cart.

A table dolly for storing and moving folding tables is disclosed in U.S. Pat. No. 5,871,219 issued Feb. 16, 1999 to Elliot. The Elliot table dolly includes a pair of oppositely inclined support members for supporting a plurality of generally planar tables that are stacked vertically in adjacent columns. The planar tables are inclined slightly relative to the horizontal to reduce the width of the table dolly and the stacked tables so that the table dolly and tables can pass through a normal sized doorway. At least two persons, however, are needed to lay the folding table on its side, fold the legs of the table inwardly to the fully closed position, and to lift and position the table on the inclined support members of the table dolly. Furthermore, the table dolly does not provide a means for securing the folding tables on the dolly. Still further, the table dolly is cumbersome to maneuver because the centers of gravity of the stacked folding tables produce significant moment arms about the center of gravity of the table dolly.

A furniture dolly for carrying generally flat furniture components, such as folding tables, is disclosed in U.S. Pat. No. 5,163,695 issued Nov. 17, 1992 to Pakowsky. The Pakowsky dolly includes a main frame for supporting a flat furniture component in an upright, inclined orientation and a strap for securing the furniture component on the main frame. However, at least two persons are needed to lay the folding table on its side, fold the legs inwardly to the fully closed position and to lift and position the table on the furniture dolly in the upright, inclined orientation against the main frame. Still further, the furniture dolly is cumbersome to maneuver because the center of gravity of the inclined folding table produces a significant moment arm about the center of gravity of the furniture dolly.

Thus, it is apparent that there exists a need for a cart for storing and moving a table that requires only one person to position the table on the cart.

It is further apparent that there exists a need for a cart for storing and moving a folding table that includes means for releasably securing the table on the cart to thereby prevent the table from falling off the cart and to prevent the cart from tipping over.

It is still further apparent that there exists a need for a cart for storing and moving a folding table that is not cumbersome to maneuver.

SUMMARY OF THE OBJECTS OF THE INVENTION

It is therefore a principle object of the present invention to provide a cart for storing and moving a folding table that requires only one person to position the table on the cart.

It is a further object of the present invention to provide a cart for storing and moving a table that includes means for releasably securing the table on the cart to thereby prevent the table from falling off the cart and to prevent the cart from tipping over.

It is a still further object of the present invention to provide a cart for storing and moving a table that is not cumbersome to maneuver.

SUMMARY OF THE INVENTION

The invention is a cart for storing and moving one or more folding tables of the type often utilized in group meeting facilities, such as hotels, banquet halls, schools and churches, and commonly referred to as a banquet table. In the past, such carts have required at least two persons to lay the folding table on it side, to lift and position the table on the cart and to maneuver the cart to another location. The invention provides a cart for storing and moving a folding table that requires only one person to position the table on the cart. The invention further provides a cart for storing and moving a table that includes means for releasably securing the table on the cart to thereby prevent the table from falling off the cart and to prevent the cart from tipping over. Still further, the invention provides a cart for storing and moving a table that is not cumbersome to maneuver. In particular, the cart includes a horizontal table bed, a vertical table backrest affixed to and extending upwardly from the table bed and at least one latching arm for releasably securing the table on the cart.

The table bed includes at least one, and preferably, a pair of horizontal support members for receiving and supporting one of the opposed edges of the table. Each of the horizontal support members may be provided with a protective cap for protecting the opposed edges of the table. The horizontal support members are longitudinally spaced apart by at least one, and preferably, a pair of longitudinal frame members affixed to the horizontal support members. The table bed further includes a plurality of legs extending downwardly from the horizontal support members and a corresponding plurality of wheels rotatably attached to the legs. Each of the legs has a first end affixed to one of the horizontal support members and a second end opposite the first end and each of the wheels is rotatably attached to the second end of one of the plurality of legs. Leg extensions may be provided to increase the transverse distance between the wheels, and thereby increase the stability of the cart. At least one brake may be mounted on one of the plurality of wheels to insure that said cart does not move when the opposed edge of the table is received on the horizontal support members of the table bed. Most importantly, the horizontal support members of the table bed are located at a height that is sufficient to receive and support the opposed edge of the table when the table is tipped to an angle of at least about forty-five degrees relative to horizontal.

The vertical table backrest includes at least one, and preferably, a pair of vertical support members for receiving and supporting the top surface of the table. The vertical support members are affixed to and extend upwardly from the table bed. The vertical support members are longitudinally spaced apart by one of the longitudinal frame members of the table bed and by a corresponding longitudinal frame member affixed to the vertical support members. The longitudinal frame member of the table backrest is located at a height that is sufficient to receive the other opposed edge of the table when the top surface of the table is generally parallel to the vertical support members of the table backrest.

The at least one latching arm is pivotally mounted to and extends outwardly from the table backrest. Preferably, a plurality of latching arms are independently mounted to the longitudinal frame member of the table backrest. Each of the latching arms includes a proximal first end pivotally mounted to the longitudinal frame member and a distal second end. Preferably, the second end of the latching arm terminates in a locking lip angled in the direction of the longitudinal frame member. The locking lip permits the latching arm to pass over the opposed edge of the table and engage the underside of the table to releasably secure the table on the cart.

In a preferred embodiment, the plurality of latching arms consists of four latching arms independently pivotally mounted on the longitudinal frame member of the table backrest. Thus, one person can store and move up to four folding tables on the cart. The person aligns the cart beside a folding table such that the horizontal support members of the table bed are adjacent and generally perpendicular to the opposed edge of the table. The person then lifts the other opposed edge of the table and thereby tips the table such that the opposed edge of the table is received and supported on the horizontal support members of the table bed. The person next continues to lift the other opposed edge of the table until the top surface of the table is generally parallel to the vertical support members of the table backrest. As the appropriate latching arm passes over the other opposed edge of the table, the locking lip of the latching arm engages the underside of the table to releasably secure the table on the cart. Finally, the person pivots the folding legs of the table to the fully closed position. The person may repeat the procedure to position up to four folding tables on the cart and may reverse the procedure to remove the folding tables from the cart.

In another preferred embodiment, the horizontal support members of the table bed are affixed to one of the longitudinal fame members of the table bed. The longitudinal frame member of the table backrest is recessed behind the vertical support members and each of a pair of latching arms are rotatable attached to one of the vertical support members. Additionally, a plurality of horizontal support members are affixed to and extend outwardly from the longitudinal frame member of the table backrest for receiving and supporting the plurality of folding chairs. Thus, a person can position a single folding table and a plurality of folding chairs on the cart.

In the alternative preferred embodiment, the cart stores and moves a single folding table and up to eight folding chairs. The person first positions at least one of the plurality of folding chairs on the horizontal support members of the table backrest between the longitudinal frame member of the table backrest and the vertical support members. The person then aligns the cart beside the folding table and tips the table as previously described to position the opposed edge of the table on the horizontal support members of the table bed. The person next continues to tip the table as previously described until the top surface of the table is generally parallel to the vertical support members of the table backrest and the locking lips of the latching arms engage the underside of the table to releasably secure the table on the cart. The person then pivots the folding legs of the table to the fully closed position. Finally, the person positions at least one of the plurality of folding chairs on the horizontal support members of the table backrest beyond the vertical support members of the table backrest and the table.

BRIEF DESCRIPTION OF THE DRAWINGS

The forgoing and other objects will become more readily apparent by referring to the following detailed description and the accompanying drawings in which.

DETAILED DESCRIPTION OF THE PREFERRED EMBODIMENTS

Preferred embodiments of the present invention will be described more fully hereinafter. However, the invention should not be construed as being limited to the embodiments described herein. Rather, it is intended that the invention be construed broadly to encompass any and all embodiments of a cart for storing and moving a table having the features disclosed herein, or equivalents thereof, which is within the skill of an ordinary person in the relevant art. In the description, like reference numerals designate like or corresponding parts throughout the several figures. It is to be also understood that such terms as "horizontal," "vertical," "transverse," "longitudinal," "upwardly," "downwardly," "widthwise" and "lengthwise" are used in the following description for purposes of locating structural elements of the invention relative to another and are not to be construed as limiting terms. Finally, it should be understood that the illustrations provided in the accompanying figures are for the purpose of describing the various preferred embodiments of the invention, and thus, are not intended to limit the scope of the invention in any manner.

Figure 1:
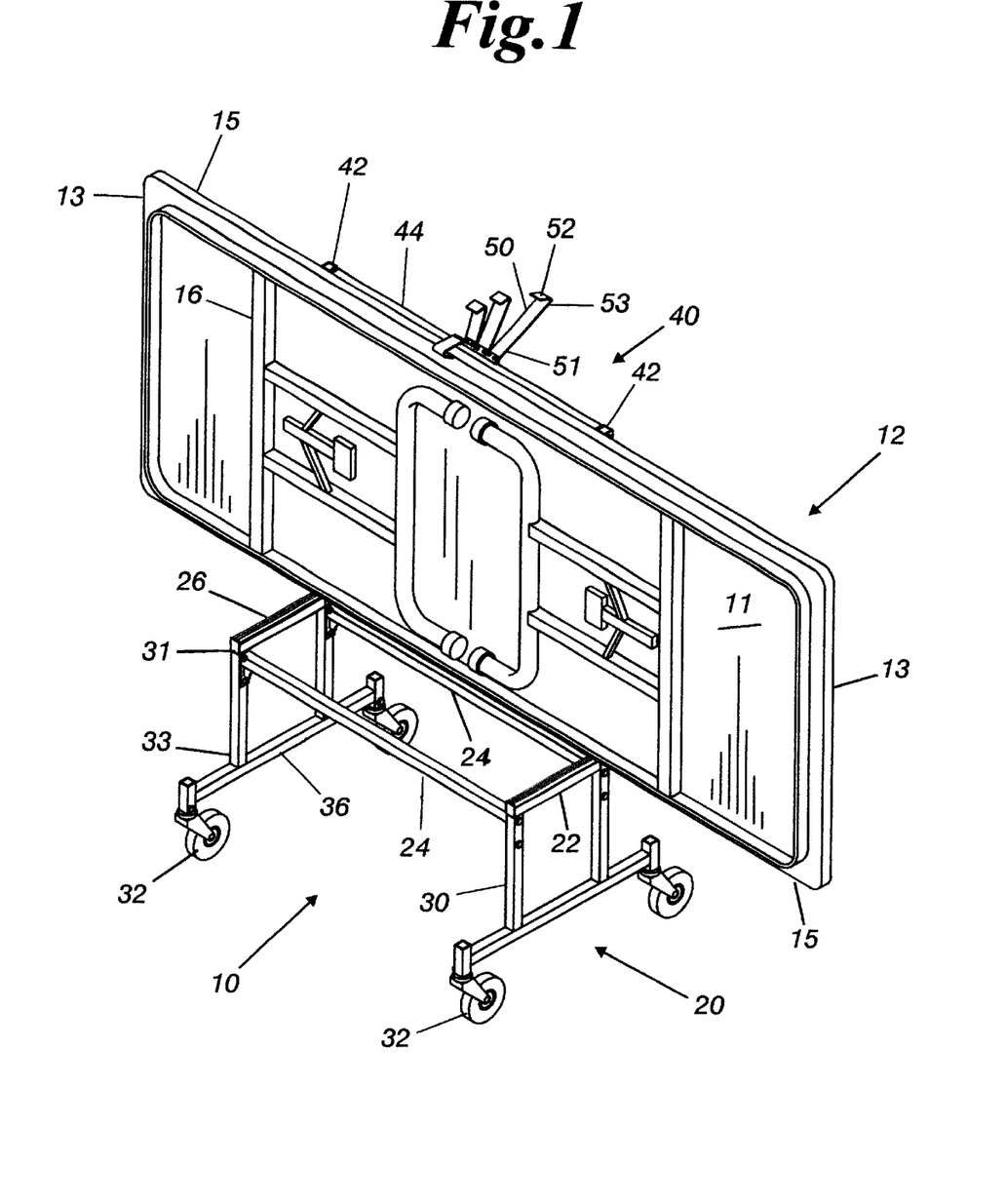
FIG. 1 is a perspective view of a cart according to the present invention for storing and moving a folding table.

Referring now more specifically to the drawings, FIG. 1 is a perspective view of a cart, indicated generally at 10, for storing and moving at least one folding table, indicated generally at 12. The cart 10 is also sometimes referred to as a "furniture truck," "dolly," "table mover," "table storage truck" or "table wheeler." The cart 10 may also be configured to store and move at least one folding chair, as will be described hereinafter with reference to FIGS. 5 and 6. As used herein, the term "folding table" refers to table having a generally planar top surface defining a continuous outer edge and two or more legs that may be pivoted or otherwise retracted (i.e., folded) inwardly against the underside of the top surface so that a plurality of the tables may positioned side-by-side for convenient, compact storage. Folding tables are often utilized at group meeting facilities, such as hotels, banquet halls, schools and churches, to provide a horizontal surface for working or eating. In many such facilities, the folding tables are utilized only temporarily and it is desirable to store the tables when not in use or to move the tables to another location within the facility. The top surface 14 (FIG. 2) of the folding table 12 may be any shape, such as round, oval, square or rectangular. As shown in FIG. 1, the top surface 14 of the folding table 12 is rectangular and defines a continuous outer edge comprising a pair of opposed widthwise edges 13 and a pair of opposed lengthwise edges 15. A rectangular folding table 12 of the type shown in FIG. 1 is commonly referred to as a "banquet table." The folding table 12 typically has a widthwise dimension of between about two and about three feet and a lengthwise dimension of between about six and about ten feet. With the folding legs 16 fully extended and locked, the top surface 14 of the folding table 12 is typically about thirty inches above the floor.

Figure 6:
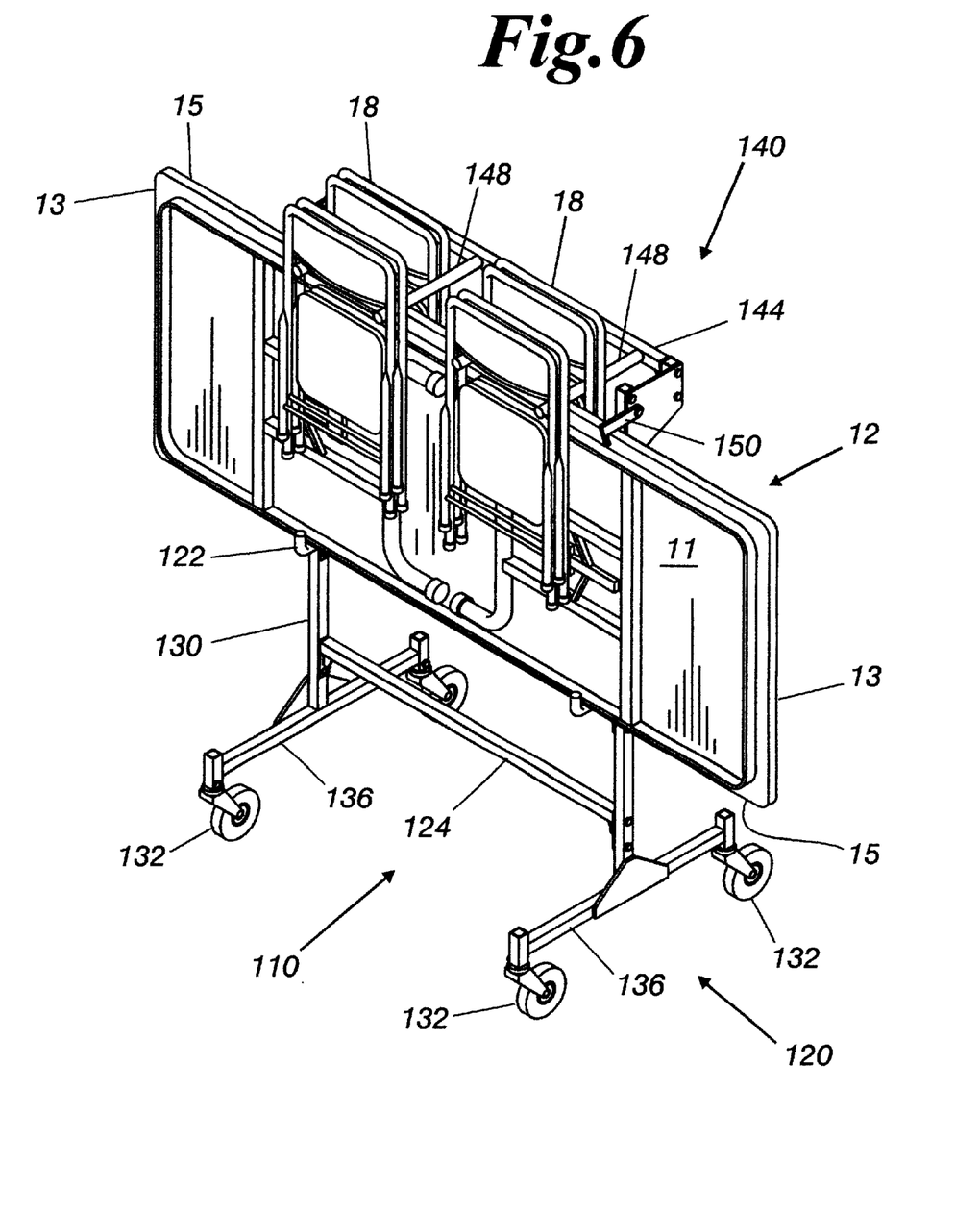
FIG. 6 is a another perspective view of the cart of FIG. 5 illustrating a single folding table, indicated by solid lines, positioned and releasably secured on the cart and a plurality of folding chairs, indicated by solid lines, positioned on the cart.

Previously known carts for storing and moving folding tables require at least two persons to lift and position the folding table on the cart and to move the cart to another location. Typically, a person standing at each end of the folding table 12 tips the table until one of the lengthwise edges 15 lays on the floor. One person then steadies the folding table 12 on the lengthwise edge 15 while the other person pivots the folding legs 16 of the table 12 inwardly against the underside 11 of the top surface 14. Both persons then lift the folding table 12 onto the cart 10 so that the lengthwise edge 15 is supported on the cart 10. Once the folding table 12 is properly positioned on the cart 10, one person is generally required to steady the table 12 while the other person moves the cart 10 to the storage location or to another location within the facility. The present invention provides a cart 10 that requires only one person to position a folding table 12 on the cart 10 and to move the cart 10 to another location. The present invention further provides a cart 10 including means for releasably securing one or more folding tables 12 on the cart 10. In the broadest sense of the invention, the cart 10 comprises a horizontal table bed 20, a vertical table backrest 40 affixed to and extending upwardly from the table bed 20 and at least one latching arm 50 pivotally mounted to the table backrest 40 for releasably securing the folding table(s) 12 on the cart 10. The cart 10 may be configured to store and move any number of folding tables 12, but preferably, the cart 10 is configured to store and move up to four folding tables 12. In an another preferred embodiment, the cart 10 is configured to store and move a single folding table 12 and up to eight conventional folding chairs 18 (FIG. 6).

The table bed 20 of the cart 10 comprises one or more horizontal support members 22 for supporting a lengthwise edge 15 of the folding table 12. The horizontal support members 22 may be made of any material, but preferably, are made of lightweight, extruded aluminum tubing having a square cross section. As shown in FIG. 1, the table bed 20 preferably comprises a pair of generally parallel, horizontal support members 22 spaced apart longitudinally by a pair of generally parallel, longitudinal frame members 24. The horizontal support members 22 are spaced apart longitudinally a suitable distance to support the folding table 12 at two or more points along the lengthwise edge 15 such that the folding table 12 will not fall onto one of the widthwise edges 13 under the influence of gravity. Preferably, the longitudinal frame members 24 are made of the same material as the horizontal support members 22. Accordingly, the horizontal support members 22 and the longitudinal frame members 24 define a generally rectangular frame that provides torsional rigidity in a horizontal plane above and generally parallel to the floor. Each of the horizontal support members 22 may be provided with a protective cap 26 for protecting the lengthwise edge 15 of the folding table 12 from damage caused by sliding the folding table 12 across the horizontal support members 22. The protective caps 26 may be made of any suitable material, but preferably are made of hard plastic or rubber. Most importantly, the horizontal support members 22 are located at a predetermined height relative to the ground, as will be described hereinafter.

The table bed 20 further comprises a plurality of legs 30 affixed to and extending downwardly from the horizontal support members 22 of the table bed 20. Preferably, the legs 30 are made of the same material as the horizontal support members 22 and the longitudinal frame members 24. Each of the legs 30 comprises a first end 31 affixed to one of the horizontal support members 22 in a conventional manner, such as with mechanical fasteners, and a second end 33 opposite the first end 31. As shown in FIG. 1, the cart 10 preferably comprises a pair of legs 30 affixed to and extending downwardly from each of the pair of horizontal support members 22. Most preferably, each leg 30 is affixed to and extends downwardly from an end of one of the horizontal support members 22. Thus, each pair of the legs 30 is spaced apart transversely by a distance equal to the length of the horizontal support members 22, typically about ten inches. In addition, the pairs of legs 30 are spaced apart longitudinally by a distance equal to the length of the longitudinal frame members 24, typically about thirty inches, as previously mentioned.

The table bed 20 further comprises a corresponding plurality of conventional castors, or wheels, 32 for cooperating with the plurality of legs 30 to support the cart 10 on the floor. Each of the wheels 32 is rotatably attached adjacent the second end 33 of one of the legs 30 such that the cart 10, and hence the folding table 12 positioned on the cart 10, can be easily maneuvered across the floor from one location to another. Preferably, the wheels 32 are of the type commonly referred to as "swivel wheels," and thus, are rotatable about a vertical axis as well as a horizontal axis. As a result, the cart 10 tends to move in the direction of the folding table 12 as the lengthwise edge 15 of the folding table 12 is positioned on the table bed 20, as will be described. Alternatively, at least one of the wheels 32 may be provided with a conventional brake 34 (FIG. 2) for preventing unwanted movement of the cart 10. Two or more transverse leg extensions 36 may also be provided for increasing the transverse distance between the wheels 32, and thereby increasing the stability of the cart 10 on the floor when a plurality of heavy folding tables 12 are positioned on the table bed 20. Preferably, the leg extension members 36 are made of the same material as the horizontal support members 22, the longitudinal frame members 24 and the legs 30 of the table bed 20. The transverse leg extensions 36 preferably increase the transverse distance between the pairs of wheels 32 from about ten inches (i.e., the length of the horizontal support members 22) to about twenty inches. The pairs of wheels 32 are preferably spaced apart longitudinally by a distance equal to the length of the longitudinal frame members 24, typically about thirty inches, as previously mentioned.

Figure 2:
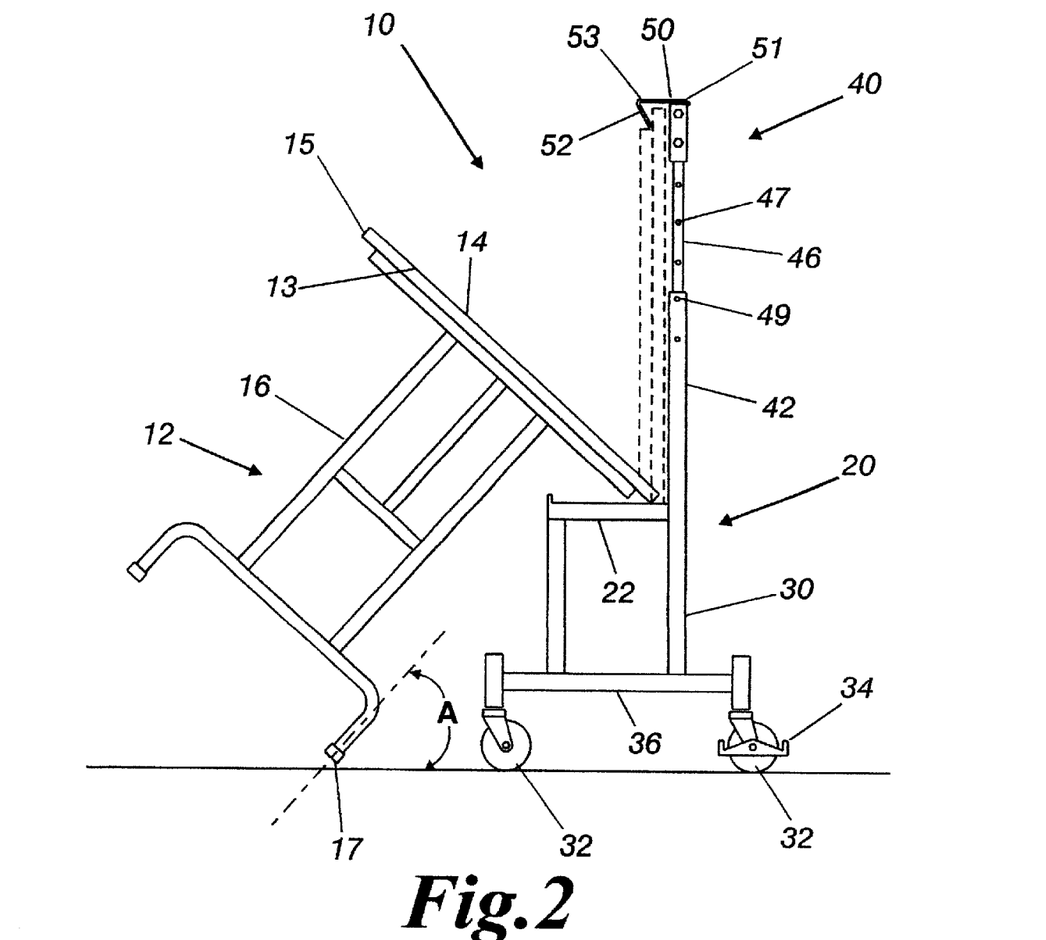
FIG. 2 is an end view of the cart of FIG. 1 illustrating the folding table, indicated by solid lines, supported on the cart and illustrating the folding table, indicated by broken lines, positioned and releasably secured on the cart by a single latching arm.

The table backrest 40 of the cart 10 comprises two or more vertical support members 42 affixed to and extending upwardly from the table bed 20. As shown in FIG. 1, the table backrest 40 preferably comprises a pair of generally parallel, vertical support members 42 spaced apart longitudinally by one of the longitudinal frame members 24 and a longitudinal frame member 44 generally perpendicular to the vertical support members 42 and generally parallel to the longitudinal frame member 24. Accordingly, the vertical support members 42, the longitudinal frame member 24 and the longitudinal frame member 44 define a generally rectangular frame that provides torsional rigidity in a vertical plane above and generally perpendicular to the floor. Preferably, the vertical support members 42 and the longitudinal frame member 44 are made of the same material as the horizontal support members 22, the longitudinal frame members 24, the legs 30 and the leg extension members 36 of the table bed 20. The vertical support members 42 are preferably spaced apart longitudinally by a distance equal to the length of the longitudinal frame member 24, typically about thirty inches, as previously mentioned. The height of the longitudinal frame member 44 above the table bed 20, and in particular above the horizontal support members 22, is suitable to support the other lengthwise edge 15 of the folding table 12. Accordingly, the height of the longitudinal frame member 44 above the horizontal support members 22 is equal to the widthwise dimension of the folding table 12, typically between about two and about three feet. Alternatively, the vertical support members 42 may include a telescoping portion 46 (FIG. 2) for adjusting the length of the vertical support members 42 in a known manner. For example, the telescoping portion 46 may have a plurality of vertically spaced openings 47 for receiving fasteners 49 therein (FIG. 2). Thus, the height of the longitudinal frame member 44 above the horizontal support members 22 may be adjusted to accommodate folding tables 12 having different widthwise dimensions.

The at least one latching arm 50 of the cart 10 is pivotally mounted to the longitudinal frame member 44 of the table backrest 40. The latching arms 50 may be located at any point along the length of the longitudinal frame member 44, but preferably, are located at a medial location on the longitudinal frame member 44 between the vertical support members 42. As shown in FIG. 1, the at least one latching arm 50 preferably comprises four latching arms 50 pivotally mounted to the longitudinal frame member 44 at a location about midway between the vertical support members 42.

Figures 3, 4:
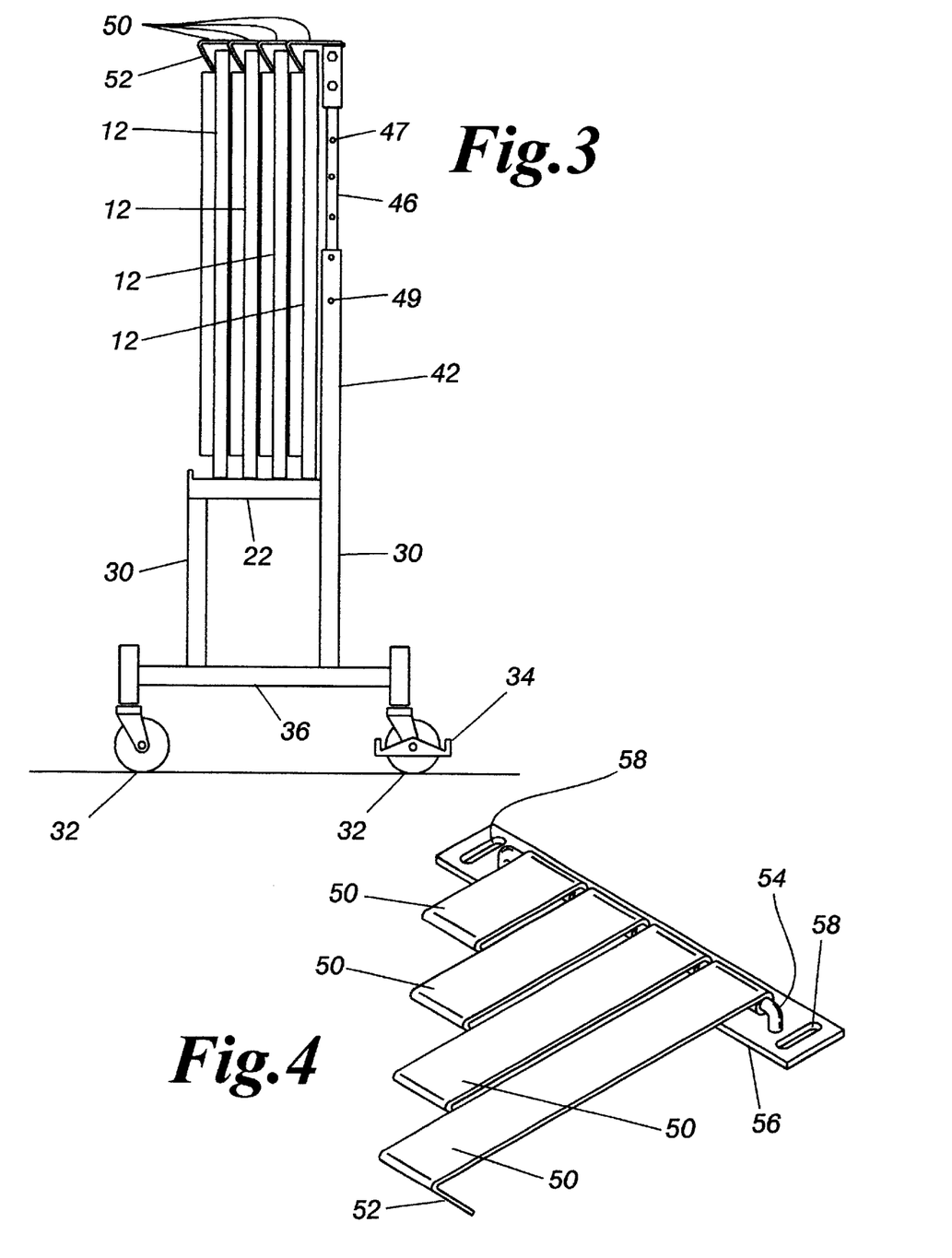
FIG. 3 is another end view of the cart of FIG. 1 illustrating a plurality of the folding tables, indicated by solid lines, positioned and releasably secured on the cart by a plurality of latching arms.
FIG. 4 is a perspective view of an alternative embodiment of the latching arms of the cart of FIG. 1.

Preferably, the latching arms 50 are made of a flexible material, such as thin gauge aluminum or heavy duty plastic. Each of the latching arms 50 preferably comprises a proximal first end 51 hinged to the upper surface of the longitudinal frame member 44 and a distal second end 53 opposite the first end 51 terminating in a locking lip 52 for engaging the underside 11 of the top surface 14 of the folding table 12. The locking lip 52 is angled in the direction of the first end 51 so that the latching arm 50 pivots about the longitudinal frame member 44 to permit the locking lip 52 to pass over the lengthwise edge 15 and engage the underside 11 of the folding table 12. Thus, the latching arm 50 releasably secures the top surface 14 of the folding table 12 against the vertical support members 42 and the longitudinal frame member 44. It should be noted that the latching arms 50 operate independently so that the cart 10 can be used to store and move up to four folding tables 12 (FIG. 3). In an alternative preferred embodiment shown in FIG. 4, the latching arms 50 may be pivotally mounted to a bar 54 affixed to a mounting plate 56. Preferably, the mounting plate 56 has an elongate slot 58 at each end and the longitudinal frame member 44 has a pair of internally threaded holes (not shown) for receiving an externally threaded fastener (not shown) in a conventional manner to mount the mounting plate 56, and thus the latching arms 50, to the longitudinal frame member 44.

Unlike previously known carts for storing and moving folding tables, the cart 10 of the present invention requires only one person to position one or more folding tables 12 on the cart 10. The person first aligns the cart 10 beside a folding table 12 with the horizontal support members 22 generally perpendicular to a lengthwise edge 15 of the table 12. The person next lifts the other lengthwise edge 15 of the folding table 12 such that the table 12 pivots, or tips, about the feet 17 of the legs 16 closest to the cart 10. As illustrated in FIG. 2, the folding table 12 is tipped to an angle A of at least forty-five degrees relative to the floor so that the lengthwise edge 15 of the folding table 12 closest to the cart 10 rests on the table bed 20, and in particular on the horizontal support members 22, under the influence of gravity. Importantly, the horizontal support members 22 are located at a height above the floor that is sufficient to receive the lengthwise edge 15 of the folding table 12 without undue risk that the feet 17 of the legs 16 closest to the cart 10 will slide away from the cart 10, and thereby cause the table 12 to fall onto the floor on the lengthwise edge 15. In particular, the height of the top surface 14 of a folding table 12 is typically about 28 inches above the floor when the folding legs 16 are fully extended and locked. The widthwise distance between the feet 17 and the nearest lengthwise edge 15 of a folding table 12, referred to herein as the width of the overhang of the lengthwise edge 15, is typically about six inches. Accordingly, the height of the horizontal support members 22 of the cart 10 should be less than the height of the top surface 14 of the folding table 12 divided by the square root of two minus the width of the overhang of the lengthwise edge 15 divided by the square root of two. In the example provided herein, the height of the horizontal support members 22 of the table bed 20 above the floor is therefore less than about seventeen inches.

Once the lengthwise edge 15 of the folding table 12 is positioned and supported on the horizontal support members 22, the person continues to lift the other lengthwise edge 15 until the folding table 12 is positioned on the cart 10 with the top surface 14 generally parallel to the vertical support members 42 of the table backrest 40. If the cart 10 is provided with swivel wheels 32, as previously described, the cart 10 tends to move slightly in the direction of the person as the folding table 12 is tipped into position, thereby assisting the person to lift the other lengthwise edge 15. Alternatively, the wheels 32 of the cart 10 may be provided with at least one brake 34, as previously described, to insure that the cart 10 does not move as the folding table 12 is tipped into position on the table bed 20. As the top surface 14 of the folding table 12 moves towards the vertical support members 42 of the table backrest 40, the appropriate latching arm 50 pivots upwardly about the longitudinal frame member 44 (or the bar 54) until the locking lip 52 passes over the lengthwise edge 15 and engages the underside 11 of the folding table 12 (FIG. 1). The person then pivots the folding legs 16 of the folding table 12 inwardly against the underside 11 of the folding table 12, as shown in FIG. 1, to the filly closed position. The person repeats the procedure until the desired number of folding tables 12 are positioned on the table bed 20 and releasably secured by the appropriate latching arm 50 of the cart 10. Thereafter, the person can utilize the cart 10 to store the folding table(s) 12 in a convenient location or to easily maneuver the folding table(s) 12 to another location. Unlike the prior art, one person can also remove the folding table(s) 12 from the cart 10 by reversing the procedure described above. Specifically, the person first pivots the folding legs 16 of the outermost folding table 12 outwardly to the fully extended and locked position (FIG. 2). The person next pivots the latching arm 50 upwardly about the longitudinal frame member 44 (or the bar 54) and tips the folding table 12 away from the cart 10 in the direction of the floor until the feet 17 of the table 12 rest securely on the floor. The person repeats the procedure until the desired number of folding tables 12 are removed from the cart 10.

Figure 5:
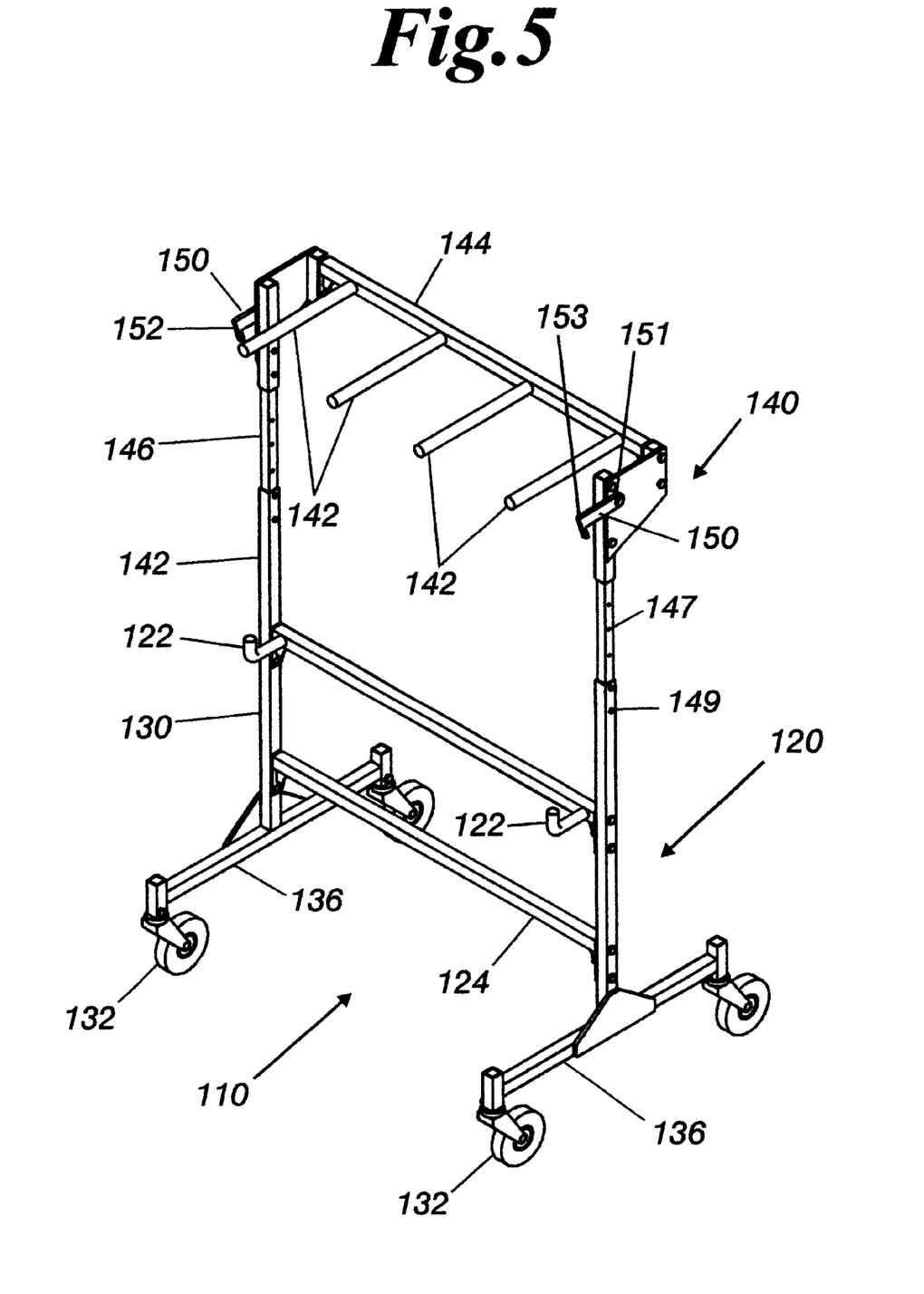
FIG. 5 is a perspective view of an alternative embodiment of a cart according to the invention for storing and moving a single folding table and a plurality of folding chars.

Another preferred embodiment of a cart 110 according to the present invention is shown in FIGS. 5 and 6. The cart 110 is configured to store and move a single folding table 12 and up to eight conventional folding chairs 18. As best shown in FIG. 5, the table bed 120 of the cart 110 comprises at least one, and preferably a pair, of horizontal support members 122 affixed to one of a pair of vertically spaced longitudinal frame members 124. The horizontal support members 122 are preferably coated with a hard plastic or rubber material for protecting the lengthwise edge 15 of the folding table 12 from damage caused by sliding the folding table 12 across the horizontal support members 122. The horizontal support members 122 are spaced apart longitudinally by the longitudinal frame member 124 and are located at a height that is sufficient to receive and support a lengthwise edge 15 of the folding table 12, as previously described. The length of each of the horizontal support members 122 is sufficient to receive the lengthwise edge 15 of the folding table 12, typically about three inches. The table bed 120 further comprises a pair of legs 130 affixed to and extending downwardly from the longitudinal frame members 124. Preferably, the table bed 120 further comprises a pair of transverse leg extensions 136 perpendicular to and extending outwardly from the legs 130. Preferably, the horizontal support members 122, the longitudinal frame members 124, the legs 130 and the transverse leg extensions 136 are made of lightweight, extruded aluminum tubing having a square cross section. The transverse leg extensions 136 terminate in a plurality of wheels 132, as previously described, for moving the cart 110 from one location to another.

The table backrest 140 of the cart 110 comprises a pair of vertical support members 142 affixed to and extending upwardly from the table bed 120. The table backrest 140 further comprises a longitudinal frame member 144 affixed to the vertical support members 142 at a height that is sufficient to receive the other lengthwise edge 15 of the folding table 12 when the top surface 14 of the folding table 12 is generally parallel to the vertical support members 142. Preferably, the vertical support members 142 comprise telescoping portions 146 having openings 147 for receiving fasteners 149 to adjust the height of the vertical support members 142, as previously described, to accommodate folding tables 12 having different widthwise dimensions. The vertical support members 142 are longitudinally spaced by the longitudinal frame members 124 and the longitudinal frame member 144. Preferably, the vertical support members 142 and the longitudinal frame member 144 are likewise made of lightweight, extruded aluminum tubing having a square cross section.

The table backrest 140 further comprises a plurality of horizontal support members 148 affixed to and extending outwardly from the longitudinal frame member 144 for receiving and engaging the folding chairs 18. Preferably, the horizontal support members 148 are made of cylindrical metal piping, such as one-half inch diameter steel pipe. The horizontal support members 148 are preferably coated with a hard plastic or rubber material for protecting the folding chairs 18 from damage caused by sliding the chairs 18 across the horizontal support members 148. The longitudinal frame member 144 is recessed from the vertical support members 142 sufficiently to receive at least two folding chairs 18 on the horizontal support members 148 between the longitudinal frame member 144 and the vertical support members 142. The horizontal support members 148 extend outwardly from the longitudinal frame member 144 sufficiently to receive at least two additional folding chairs 18 on the horizontal support members 148 beyond the vertical support members 142 and the folding table 12.

The at least one latching arm 150 of the cart 110 comprises a pair of latching arms 150 mounted to and extending outwardly from the vertical support members 142. Preferably, the latching arm 150 is made of a somewhat flexible material, such as thin gauge aluminum or heavy duty plastic. Each of the latching arms 150 preferably comprises a proximal first end 151 rotatably mounted to the vertical support member 142 and a distal second end 153 opposite the first end 151. The second end 153 terminates in a locking lip 152 for engaging the underside 11 of the top surface 14 of the folding table 12. The locking lip 152 is angled in the direction of the first end 151 so that the latching arm 150 pivots about the vertical support member 142 to permit the locking lip 152 to pass over the lengthwise edge 15 and engage the underside 11 of the folding table 12 (FIG. 6). Thus, the latching arm 150 releasably secures the top surface 14 of the folding table 12 against the vertical support members 142. It should be noted that the latching arms 150 operate independently, and thus, one or both of the latching arms 150 may be utilized to releasably secure the folding table 12 on the cart 110.

Unlike previously known carts for storing and moving folding tables, the cart 110 of the present invention requires only one person to position a folding table 12 and up to eight folding chairs 18 on the cart 110. The person first positions two or more folding chairs 18 on the horizontal support members 148 between the longitudinal frame member 144 and the vertical support members 142 (FIG. 6). The person then aligns the cart 110 beside a folding table 12 with the horizontal support members 122 generally perpendicular to a lengthwise edge 15 of the folding table 12. The person next lifts the other lengthwise edge 15 of the folding table 12 such that the table 12 pivots, or tips, about the feet 17 of the legs 16 closest to the cart 110. The person tips the folding table 12 to an angle of at least forty-five degrees relative to the floor so that the lengthwise edge 15 of the folding table 12 closest to the cart 110 rests on the table bed 120, and in particular on the horizontal support members 122, under the influence of gravity. Importantly, the horizontal support members 122 are located at a height above the floor that is sufficient to receive and support the lengthwise edge 15 of the folding table 12 without undue risk that the feet 17 of the legs 16 closest to the cart 110 will slide away from the cart 110, and thereby cause the table 12 to fall onto the floor on the lengthwise edge 15. In particular, the height of the horizontal support members 122 of the cart 110 is less than about seventeen inches, as previously described.

Once the lengthwise edge 15 of the folding table 12 is supported on the horizontal support members 122, the person continues to lift the other lengthwise edge 15 until the folding table 12 is positioned on the cart 110 with the top surface 14 generally parallel to the vertical support members 142 of the table backrest 140. If the cart 110 is provided with swivel wheels 134, as previously described, the cart 110 tends to move slightly in the direction of the person as the folding table 12 is tipped into position, thereby assisting the person to lift the other lengthwise edge 15. As the top surface 14 of the folding table 12 moves towards the vertical support members 142 of the table backrest 140, the latching arm(s) 150 rotate upwardly about the vertical support member(s) 142 until the locking lip 152 passes or the lengthwise edge 15 and engages the underside 11 of the folding table 12 (FIG. 6). The person then pivots the folding legs 16 of the folding table 12 inwardly against the underside 11 of the folding table 12, as illustrated in FIG. 6, to the fully closed position. The person then positions two or more folding chairs 18 on the horizontal support members 148 beyond the vertical support members 142 and the folding table 12. Thereafter, the person can utilize the cart 110 to store the folding table 12 and folding chairs 18 in a convenient location or to move the folding table 12 and folding chairs 18 to another location. Unlike the prior art, one person can also remove the folding table 12 and folding chairs 18 from the cart 110 by reversing the procedure described above. Specifically, the person first removes the folding chairs 18 positioned beyond the vertical support members 142 and the folding table 12 from the horizontal support members 148. The person then pivots the folding legs 16 of the folding table 12 outwardly to the fully extended and locked position (FIG. 2). The person next rotates the latching arm(s) 150 upwardly about the vertical support member(s) 142 and tips the folding table 12 away from the cart 110 in the direction of the floor until the feet 17 of the table 12 rest securely on the floor. Finally, the person removes the folding chairs 18 positioned between the longitudinal frame member 144 and the vertical support members 142 from the horizontal support members 148.

It is to be understood that the forgoing description and preferred embodiments shown and described herein are merely illustrative of the best mode of the invention and the principals thereof, and that various modifications and additions may be made by those skilled in the art without departing unnecessarily from the spirit and scope of the invention, which is intended to be limited only by the scope of the appended claims. Accordingly, the present invention is intended to be construed broadly enough to encompass any and all embodiments, and equivalents thereof within the spirit and scope of the appended claims.

That which is claimed is:

1. A cart for storing and moving a folding table, the table having a generally planar top surface, a plurality of folding legs and a pair of opposed edges, said cart comprising:

a horizontal table bed comprising
        a pair of horizontal support members for receiving and supporting one of the opposed edges of the table;
        at least one longitudinal frame member affixed to said horizontal support members such that said pair of horizontal support members are longitudinally spaced apart by said longitudinal frame member;
        a plurality of downwardly extending legs, each of said legs having a first end affixed to said horizontal support member and a second end opposite the first end; and
        a plurality of wheels, each of said wheels rotatably attached to the second end of a corresponding one of said plurality of legs;
    a vertical table backrest comprising
        at least one vertical support member for receiving and supporting the top surface of the table, said vertical support member affixed to and extending upwardly from said table bed; and
    at least one latching arm pivotally mounted to and extending outwardly from said table backrest, said latching arm engaging the other opposed edge of the table to releasably secure the table on said cart.

2. A cart according to claim 1 wherein said at least one horizontal support member of said table bed is located at a height such that said horizontal support member receives and supports the opposed edge of the table when the table is tipped to an angle of at least about forty-five degrees relative to horizontal.

3. A cart according to claim 1 wherein said cart stores and moves a plurality of folding tables and wherein said at least one latching arm comprises a corresponding plurality of latching arms, each of said latching arms engaging the other opposed edge of one of the corresponding plurality of tables.

4. A cart according to claim 3 wherein said cart stores and moves up to four folding tables and wherein said plurality of latching arms comprises four latching arms.

5. A cart according to claim 1 wherein said horizontal support member of said table bed is provided with a protective cap for protecting the opposed edge of the table.

6. A cart according to claim 1 wherein said table bed further comprises at least one leg extension affixed to at least one of said plurality of legs and rotatably attached to at least one of said plurality of wheels, said leg extension increasing the transverse distance between a pair of said plurality of wheels to increase the stability of said cart.

7. A cart according to claim 1 wherein said table bed further comprises at least one brake mounted on one of said plurality of wheels to insure that said cart does not move when the opposed edge of the table is received on said horizontal support member of said table bed.

8. A cart according to claim 1 wherein each of said plurality of legs of said table bed has a first end affixed to and extending downwardly from one of said pair of horizontal support members and a second end opposite the first end;

each of said plurality of wheels of said table bed is rotatably attached to the second end of a corresponding one of said legs.

9. A method of storing and moving a folding table utilizing the cart of claim 1, said method comprising the steps of:

aligning the cart beside the table such that said horizontal support member of said table bed is adjacent and generally perpendicular to the opposed edge of the table;

lifting the other opposed edge of the table and thereby tipping the table such that the opposed edge of the table is received and supported on said horizontal support member of said table bed;

continuing to lift the other opposed edge of the table until the top surface of the table is generally parallel to said vertical support member of said table backrest, engaging the other opposed edge of the table with said latching arm to releasably secure the table on the cart; and pivoting the plurality of folding legs of the table in the direction of the top surface of the table until the folding legs are in the fully closed position.

10. A cart for storing and moving a folding table, the table having a generally planar top surface, a plurality of folding legs and a pair of opposed edges, said cart comprising:

a horizontal table bed comprising
   at least one horizontal support member for receiving and supporting one of the opposed edges of the table;
   a plurality of downwardly extending legs, each of said legs having a first end affixed to said horizontal support member and a second end opposite the first end; and
   a plurality of wheels, each of said wheels rotatably attached to the second end of a corresponding one of said plurality of legs;

a vertical table backrest comprising
   a pair of vertical support members for receiving and supporting the top surface of the table, said vertical support member affixed to and extending upwardly from said table bed;
   at least one longitudinal frame member affixed to said vertical support members such that said pair of vertical support members are longitudinally spaced apart by said longitudinal frame member;
   a plurality of horizontal support members for supporting a plurality of folding chairs, said horizontal support members affixed to and extending outwardly from said longitudinal frame member; and at least one latching arm pivotally mounted to and extending outwardly from said table backrest, said latching arm engaging the other opposed edge of the table to releasably secure the table on said cart.

11. A cart according to claim 10 wherein said at least one horizontal support member of said table bed is located at a height such that said horizontal support member receives and supports the opposed edge of the table when the table is tipped to an angle of at least about forty-five degrees relative to horizontal.

12. A cart according to claim 10 wherein said cart stores and moves one folding table and up to eight folding chairs and wherein said at least one latching arm comprises a pair of latching arms, each of said latching arms affixed to one of said vertical support members of said table backrest.

13. A cart according to claim 10 wherein said table bed further comprises at least one brake mounted on one of said plurality of wheels to insure that said cart does not move when the opposed edge of the table is received on said horizontal support member of said table bed.

14. A cart according to claim 10 wherein
   said at least one horizontal support member of said table bed comprises a pair of horizontal support members;
   said table bed further comprises at least one longitudinal frame member affixed to said vertical support members of said table backrest such that said vertical support members are longitudinally spaced apart by said longitudinal frame member of said table bed;
   each of said plurality of legs of said table bed has a first end affixed to and extending outwardly from one of said pair of vertical support members and a second end opposite the first end;
   each of said plurality of wheels of said table bed is rotatably attached to the second end of a corresponding one of said legs.

15. A cart according to claim 14 wherein each of said pair of horizontal support members of said table bed is affixed to one of said vertical support members of said table backrest.

16. A cart according to claim 14 wherein each of said pair of horizontal support members of said table bed is affixed to said longitudinal frame member of said table bed.

17. A method of storing and moving a folding table utilizing the cart of claim 10, said method comprising the steps of:

aligning the cart beside the table such that said horizontal support member of said table bed is adjacent and generally perpendicular to the opposed edge of the table;

lifting the other opposed edge of the table and thereby tipping the table such that the opposed edge of the table is received and supported on said horizontal support member of said table bed;

continuing to lift the other opposed edge of the table until the top surface of the table is generally parallel to said vertical support members of said table backrest;

engaging the other opposed edge of the table with said latching arm to releasably secure the table on the cart; and pivoting the plurality of folding legs of the table in the direction of the top surface of the table until the folding legs are in the fully closed position.

18. A method of storing and moving a folding table and a plurality of folding chairs utilizing the cart of claim 10, said method comprising the steps of:

positioning at least one of the plurality of folding chairs on said horizontal support members of said table backrest between said longitudinal frame member of said table backrest and said vertical support members of said table backrest;

aligning the cart beside the table such that said horizontal support member of said table bed is adjacent and generally perpendicular to the opposed edge of the table;

lifting the other opposed edge of the table and thereby tipping the table such that the opposed edge of the table is received and supported on said horizontal support member of said table bed;

continuing to lift the other opposed edge of the table until the top surface of the table is generally parallel to said vertical support members of said table backrest;

engaging the other opposed edge of the table with said latching arm to releasably secure the table on the cart;

pivoting the plurality of folding legs of the table in the direction of the top surface of the table until the folding legs are in the fully closed position; and positioning at least one of the plurality of folding chairs on said horizontal support members of said table backrest beyond said vertical support members of said table backrest and the table.

* * * * *